April 14, 1931.  M. F. CARR  1,801,221
SEPARABLE SNAP FASTENER
Filed Oct. 5, 1929
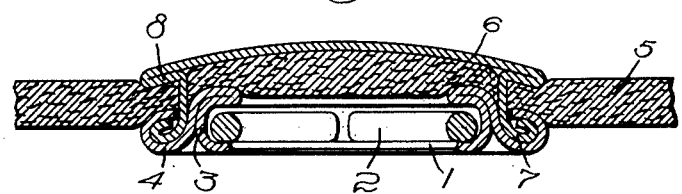
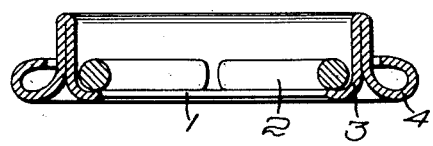
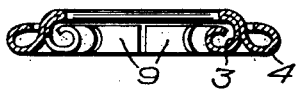
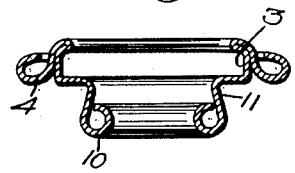
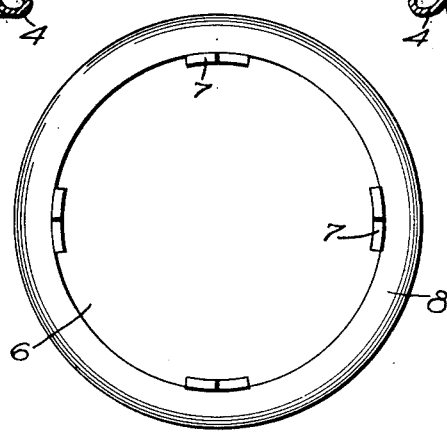
Inventor:
Moses F. Carr,
by Emery, Booth, Varney & Townsend
Att'ys Patented Apr. 14, 1931

1,801,221

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE SNAP FASTENER

Application filed October 5, 1929. Serial No. 397,518.

My invention aims to provide improvements in separable snap fasteners.

In the drawings which illustrate preferred embodiments of my invention:—

Figure 1 is a section through a socket installation embodying my invention;

Fig. 2 is a section of one type of socket embodying my invention and showing the manner of assembly of the parts;

Fig. 3 is an under side view of an attaching plate;

Fig. 4 is a section of a one-piece socket embodying my invention; and

Fig. 5 is a section of a stud embodying my invention.

The invention which I have illustrated in the drawings in connection with several forms of snap fastener members, comprises the anvil means at the periphery of a fastener member independent of the means which cooperates with another fastener member but provided as a part of the unit.

In Figure 1 I have shown a type of fastener socket well known in the art to which my invention has been applied. The socket comprises a sheet metal casing part formed from a single piece of metal and having a stud-receiving aperture 1 intersected by a spring 2 contained within an annular U-shaped portion 3. From one edge of the U-shaped portion the metal is doubled back and extended outwardly beyond the periphery of the U-shaped portion to provide anvil and clenching means 4. Thus, I have provided three concentrically arranged walls all located in the same plane to provide a compact socket.

The socket, as shown in Figure 1, is located at one side of a fabric 5, or other suitable support, and an attaching cap 6 is located at the opposite side. The elements of the installation are secured together by means of a number of prongs 7 extending from the inner edge of an inwardly turned flange 8, on the under side of the cap 6, through the fabric 5 and upset and clenched by the anvil and clenching means 4. This type of attachment is highly desirable because it reduces the number of parts to a minimum and at the same time provides an installation of minimum thickness.

The spring 2 is easily assembled with the casing because the connecting portions of two inner walls are first formed as shown in Fig. 2 and then bent inwardly after the spring 2 is inserted.

The device shown in Fig. 4 is in all respects the same as illustrated and described with relation to the device shown in Figs. 1 through 3, except that integral spring fingers 9 are provided as a part of the casing instead of the annular separate spring 2.

In the device shown in Fig. 5 I have illustrated the use of my improved attaching means in connection with a stud having a head 10 and a neck 11, instead of the socket means shown in Figs. 1 and 4.

While I have illustrated and described several embodiments of my invention, I do not wish to be limited thereby, because the scope of my invention is best defined by the following claims.

Claims:

1. A snap fastener member having three annular walls arranged one within another and located in the same plane, turning and clenching means provided by two of said walls, snap fastener engaging means supported by the third wall and two of said walls being arranged close together and being bent inwardly toward the center of the fastener member to provide a support-engaging surface of substantial width located laterally inwardly relative to the said turning and clenching means.

2. A snap fastener socket member having concentrically arranged walls all located in the same general plane, the outer wall having its edge turned inwardly, a curved web connecting the outer and second wall and providing an anvil to upset attaching means for securing the socket to a support, an inwardly turned flange of double thickness connected to said second and third walls which are located close together, a flange extending inwardly from said third wall and spaced parallel to said double flange, said flange surrounding a stud-receiving aperture through the socket and a wire spring located between and held in position by said flanges and said third wall.

3. A snap fastener installation comprising, in combination, a carrying medium, a snap fastener element located at one side of said carrying medium, said fastener element having three concentric walls, one edge of the outer wall being turned inwardly and engaging the carrying medium, the two other walls being arranged close together and connected by a portion turned inwardly and engaging the carrying medium, said outer wall and the second wall being connected by a curved portion spaced from said carrying medium and an attaching member located at that side of the carrying medium opposite the fastener member and having prongs passing through the carrying medium, between said two inwardly bent carrying medium engaging portions and being upset and clenched by the said curved portion connecting the outer and second walls and by the inwardly turned portion of the said outer wall.

In testimony whereof, I have signed my name to this specification.

MOSES F. CARR.